United States Patent
Hirota et al.

(10) Patent No.: US 11,530,628 B2
(45) Date of Patent: Dec. 20, 2022

(54) DENITRATION DEVICE, HEAT RECOVERY STEAM GENERATOR HAVING THE SAME, GAS TURBINE COMBINED CYCLE POWER PLANT AND METHOD OF DENITRATION

(71) Applicant: MITSUBISHI HITACHI POWER SYSTEMS, LTD., Yokohama (JP)

(72) Inventors: Akira Hirota, Kanagawa (JP); Kanji Ishikawa, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 91 days.

(21) Appl. No.: 16/967,244

(22) PCT Filed: Feb. 4, 2019

(86) PCT No.: PCT/JP2019/003810
§ 371 (c)(1),
(2) Date: Aug. 4, 2020

(87) PCT Pub. No.: WO2019/159734
PCT Pub. Date: Aug. 22, 2019

(65) Prior Publication Data
US 2021/0033005 A1  Feb. 4, 2021

(30) Foreign Application Priority Data
Feb. 16, 2018  (JP) .............................. JP2018-026146

(51) Int. Cl.
*F01K 23/10* (2006.01)
*B01D 53/94* (2006.01)
(Continued)

(52) U.S. Cl.
CPC .......... *F01K 23/10* (2013.01); *B01D 53/9431* (2013.01); *F01N 3/10* (2013.01);
(Continued)

(58) Field of Classification Search
CPC .......... F01N 3/10; F01N 3/2066; F01N 3/208; B01D 53/9431; B01D 2255/20707;
(Continued)

(56) References Cited

U.S. PATENT DOCUMENTS 4,131,432 A   12/1978  Sato et al.
7,824,636 B1  11/2010  Kraemer et al.
(Continued)

FOREIGN PATENT DOCUMENTS

JP    S52-097012 A    8/1977
JP    S55-116425 A    9/1980
(Continued)

OTHER PUBLICATIONS

International Search Report dated Apr. 2, 2019, issued in counterpart Application No. PCT/JP2019/003810, with English Translation. (4 pages).
(Continued)

*Primary Examiner* — Devon C Kramer
*Assistant Examiner* — Kelsey L Stanek
(74) *Attorney, Agent, or Firm* — WHDA, LLP

(57) ABSTRACT

A denitration device comprising a duct (22) that leads and distributes exhaust gas from a turbine (56) of a gas turbine (50) including a compressor (52) and the turbine (56), an ammonia injection grid (24) that sprays, into the duct (22), an mixed gas in which ammonia gas and dilution air are mixed with each other, and a denitration catalyst (26) that is installed on a downstream side of flow of the exhaust gas of the ammonia injection grid in the duct (22), and there is provided an air bleeding line (76) that is connected to a low compression portion of the compressor (52) of the gas turbine (50) and supplies air bled of the compressor (52) into the ammonia injection grid (24) as the dilution air.

4 Claims, 3 Drawing Sheets

(51) Int. Cl.
*F01N 3/10* (2006.01)
*F02C 7/00* (2006.01)

(52) U.S. Cl.
CPC ...... *F02C 7/00* (2013.01); *B01D 2255/20707* (2013.01); *B01D 2255/20723* (2013.01); *B01D 2255/20769* (2013.01); *B01D 2255/20776* (2013.01)

(58) Field of Classification Search
CPC ........... B01D 2255/20723; B01D 2255/20769; B01D 2255/20776; F01K 23/10; F02C 7/00
USPC ............................... 60/39.182; 422/119, 148
See application file for complete search history.

(56) References Cited

U.S. PATENT DOCUMENTS

| | | | |
|---|---|---|---|
| 2011/0030331 A1* | 2/2011 | Tong ...................... | F01N 3/2066 60/39.5 |
| 2013/0031910 A1* | 2/2013 | Merchant ........... | B01D 53/8631 60/772 |
| 2013/0259755 A1* | 10/2013 | Kim ................... | B01D 53/9431 422/111 |
| 2016/0376908 A1* | 12/2016 | Reed ........................ | F02C 9/18 290/52 |

FOREIGN PATENT DOCUMENTS

| JP | S60-095926 U | 6/1985 |
|---|---|---|
| JP | 2004167450 A | 6/2004 |
| JP | 2007-326055 A | 12/2007 |
| JP | 4187894 B2 | 11/2008 |
| JP | 4202583 B2 | 12/2008 |
| JP | 2011027102 A | 2/2011 |
| JP | 2014-211102 A | 11/2014 |
| JP | 2014211102 A * | 11/2014 |
| JP | 2017-015076 A | 1/2017 |

OTHER PUBLICATIONS

Written Opinion dated Apr. 2, 2019, issued in counterpart Application No. PCT/JP2019/003810, with English Translation. (11 pages).
Office Action dated Nov. 30, 2021, issued in counterpart JP application No. 2018-026146, with English translation. (7 pages).
Office Action dated Jun. 14, 2022, issued in counterpart JP application No. 2018-026146, with English translation. (7 pages).

* cited by examiner

DENITRATION DEVICE, HEAT RECOVERY STEAM GENERATOR HAVING THE SAME, GAS TURBINE COMBINED CYCLE POWER PLANT AND METHOD OF DENITRATION

TECHNICAL FIELD

The present disclosure relates to a denitration device, a heat recovery steam generator having the same, a gas turbine combined cycle power plant and a denitration method.

BACKGROUND ART

In a gas turbine combined cycle power plant, in order to remove nitrogen oxides (NOx) contained in exhaust gas discharged from the a gas turbine and led to a heat recovery steam generator (HRSG; Heat Recovery Steam Generator), a denitration device including an ammonia injection grid (AIG; Ammonia Injection Grid) for spraying an ammonia dilution gas into the exhaust gas in the flow direction of gas flow and a denitration catalyst is provided in the middle of a duct in which the exhaust gas flows. Nitrogen oxides (NOx) contained in the exhaust gas are removed by causing a denitration reaction with ammonia in the ammonia dilution gas by the denitration catalyst.

The ammonia injection grid is required to maintain the pressure in the ammonia injection grid at a pressure higher than the pressure in the duct in order to spray the ammonia dilution gas, and also supply air for diluting the ammonia dilution gas to be sprayed to a concentration suitable for the denitration reaction.

PTL 1 discloses a method of bleeding a part of air of a high compression portion of a compressor, performing pressure adjustment (pressure reduction) and temperature adjustment on the bled air so as to satisfy a condition necessary for vaporizing ammonia water, mixing the air with the ammonia water and then supplying the mixture to a heat recovery steam generator.

Citation List

Patent Literature

[PTL 1] The publication of Japanese Patent No. 4187894

SUMMARY OF INVENTION

Technical Problem

An example of a method different from the method disclosed in PTL 1 is a method of diluting an ammonia gas with air blown from a dedicated fan, and maintaining the pressure in the ammonia injection grid at a pressure higher than the pressure of exhaust gas in the duct.

The method disclosed in PTL 1 is required to bleed high-temperature air of the high compression portion of the compressor in order to vaporize the ammonia water. However, according to PTL 1, in order to vaporize the ammonia water, it is necessary to adjust the pressure of air to 0.2 atm, which needs a certain step to decompress the air which has been compressed by the compressor. In addition, when the air is compressed more than necessary, the energy used for the compression may be lost as it is.

Further, in the method of blowing air with a fan, when the fan falls into an unusable state for some reason, the pressure in the ammonia injection grid becomes lower than the pressure in the duct, so that the exhaust gas flowing in the duct may flow into the ammonia injection grid. When the inflow of the exhaust gas into the ammonia injection grid occurs, carbon dioxide in the exhaust gas reacts with ammonia in the ammonia injection grid to generate ammonium carbonate, which may cause a risk that the ammonia injection grid (particularly, the inside of a nozzle from which the ammonia gas is jetted) is clogged due to deposition of ammonium carbonate.

The present disclosure has been made in view of such circumstances, and has an object to provide a denitration device capable of stably supplying air for dilution to an ammonia injection grid, and preventing clogging in the ammonia injection grid caused by generation of ammonium carbonate by suppressing exhaust gas flowing in a duct from flowing into the ammonia injection grid, a heat recovery steam generator, a gas turbine combined cycle power plant, and a denitration method.

Solution to Problem

In order to solve the above problem, a denitration device, a heat recovery steam generator having the same, a gas turbine combined cycle power plant, and a denitration method according to the present disclosure adopt the following means.

In other words, a denitration device according to an aspect of the present disclosure comprises a duct that leads and distributes exhaust gas from a turbine of a gas turbine having a compressor and the turbine, an ammonia injection grid that sprays, into the duct, an ammonia mixed gas in which ammonia gas and dilution air are mixed with each other, and a denitration catalyst that is installed on a downstream side of flow of the exhaust gas of the ammonia injection grid in the duct, and performs a denitration reaction between the exhaust gas and the ammonia mixed gas, and comprises an air bleeding line that is connected to a low compression portion of the compressor and supplies a low compression air bled of the compressor into the ammonia injection grid as the dilution air.

The denitration device according to the present aspect comprises an air bleeding line that is connected to the low compression portion of the compressor of the gas turbine and supplies the low compression air bled of the compressor (low compression portion) to the ammonia injection grid as dilution air. According to the denitration device, it is possible to supply substantially normal-temperature and low-compression dilution air to the ammonia injection grid through the air bleeding line from the low compression portion (for example, first to third stages from a suction side) without separately providing a fan for supplying a dilution air to be mixed with an ammonia gas (air for diluting the ammonia gas to a concentration suitable for a denitration reaction and supplying the diluted ammonia gas). As a result, a substantially constant amount of substantially normal-temperature and low-compression dilution air can be stably supplied through the air bleeding line. As a result, the exhaust gas discharged from the gas turbine can be suppressed from flowing into the ammonia injection grid by constantly maintaining the pressure in the ammonia injection grid at a pressure higher than the pressure of the exhaust gas in the duct during operation of the gas turbine. By suppressing the inflow, it is possible to prevent clogging in the ammonia injection grid, particularly inside a nozzle from which an ammonia gas is jetted, due to generation and deposition of ammonium carbonate in the ammonia injection grid. Further, since a fan for supplying dilution air is not separately provided, peripheral devices such as a power source, a power line, and a control device necessary for driving the fan are not required, and the facility cost and running cost can be reduced.

Further, the dilution air is used to dilute an ammonia gas, and it is required only to bleed substantially normal-temperature and low-compression air of the low-compression portion of the compressor, so that it is not required to bleed high-temperature dilution air of a high-compression portion of the compressor. In other words, air which has been compressed to a high pressure by the compressor is not required to be decompressed in order to use the compressed air as dilution air, and the energy loss can be reduced because high-pressure air which has worked to become high pressure air in the compressor is not bled and used.

In the denitration device according to an aspect of the present disclosure, the air bleeding line includes a damper whose opening degree is constant during operation.

In the denitration device according to the present aspect, the air bleeding line is provided with the damper whose opening degree is constant during operation of the gas turbine. During supply of the dilution air, the opening degree of the damper is set to a constant opening degree (fixed opening degree), which makes it unnecessary to control the opening degree of the damper, so that it is unnecessary to perform control of adjusting the opening degree of the damper according to the flow rate of the exhaust gas. For example, the opening degree of the damper is set so as to cause the dilution air to flow at a flow rate at which the ammonia concentration of the ammonia mixed gas in which ammonia gas has been diluted with the dilution air falls within a predetermined range. The flow rate of the exhaust gas and the flow rate of the ammonia gas increase or decrease within a predetermined ratio range according to the operating load of the gas turbine, and according to the above increase or decrease, ammonia necessary for the denitration reaction also is increased or decreased and supplied, so that the operation can be performed with the same opening degree of the damper regardless of the flow rate of the exhaust gas. In other words, during operation of the gas turbine, an appropriate amount of dilution air can be constantly supplied without controlling the opening degree of the damper. In other words, the ammonia mixed gas of the ammonia gas and the dilution air can be appropriately sprayed into the duct without controlling the opening degree of the damper.

A heat recovery steam generator according to an aspect of the present disclosure includes the denitration device described above, and a heat exchanger provided in the duct.

According to the heat recovery steam generator according to the present aspect, it is possible to stably supply dilution air to the ammonia injection grid without separately providing a fan for supplying dilution air. As a result, the heat recovery steam generator including the heat exchanger and the denitration device in the duct can suppress exhaust gas from flowing into the ammonia injection grid by maintaining the pressure in the ammonia injection grid at a pressure higher than the pressure of exhaust gas in the denitration device which is led from the turbine of the gas turbine and distributed in the heat recovery steam generator, and it is possible to prevent clogging in the ammonia injection grid due to generation and deposition of ammonium carbonate in the ammonia injection grid.

A gas turbine combined cycle power plant according to an aspect of the present disclosure comprises the denitration device described above, the gas turbine, and a generator that is rotationally connected to the gas turbine.

According to the gas turbine combined cycle power plant according to the present aspect, the compressor is rotationally driven by the gas turbine, and thus when the gas turbine stops and the exhaust gas is not discharged, the compressor also stops in conjunction, and does not supply the ammonia mixed gas. Therefore, the control of the ammonia injection grid can be simplified. For example, when the dilution air is supplied by a fan, it is necessary to perform control of stopping the fan in response to the stop of the gas turbine.

Further, during power generation, the number of revolutions of the compressor is constant regardless of the operating load of the gas turbine. Therefore, it is possible to stably supply a substantially constant amount of substantially normal-temperature and low-compression dilution air from the low compression portion of the compressor to the ammonia injection grid through the air bleeding line. As a result, the pressure in the ammonia injection grid can be maintained at a pressure higher than the pressure of the exhaust gas in the duct. Accordingly, the exhaust gas discharged from the gas turbine can be prevented from flowing into the ammonia injection grid, and the ammonia injection grid can be prevented from being clogged due to generation and deposition of ammonium carbonate in the ammonia injection grid.

A denitration method according to an aspect of the present invention is a denitration method for a denitration device comprising a duct that leads and distributes exhaust gas from a turbine of a gas turbine having a compressor and the turbine, an ammonia injection grid that sprays, into the duct, an ammonia mixed gas in which ammonia gas and dilution air are mixed with each other, and a denitration catalyst that is installed on a downstream side of flow of the exhaust gas of the ammonia injection grid in the duct, and performs a denitration reaction between the exhaust gas and the ammonia mixed gas, wherein the denitration device comprises an air bleeding line connected to a low compression portion of the compressor, the denitration method comprising supplying a low compression air bled of the compressor through the air bleeding line into the ammonia injection grid as the dilution air.

There can be provided a denitration method that makes it possible to stably supply the dilution air to the ammonia injection grip without separately providing a fan for supplying the dilution air, and suppress the exhaust gas from flowing into the ammonia injection grid, whereby it is possible to prevent clogging in the ammonia injection grid due to generation and deposition of ammonium carbonate in the ammonia injection grid. Further, the denitration method of the present aspect can be adopted for existing equipment with a simple construction.

Advantageous Effects of Invention

According to the denitration device, the heat recovery steam generator having the same, the gas turbine combined cycle power plant, and the denitration method according to the present disclosure, it is possible to stably supply the dilution air to the ammonia injection grid and suppress the exhaust gas flowing in the duct from flowing into the ammonia injection grid, whereby it is possible to prevent clogging inside the ammonia injection grid due to generation of ammonium carbonate.

DESCRIPTION OF EMBODIMENTS

An embodiment of the present disclosure will be described hereinafter with reference to FIGS. 1 to 3.

First, a suitable gas turbine combined cycle power plant in which a denitration device of an example according to some embodiments of the present disclosure is adopted will be described.

Figure 1:
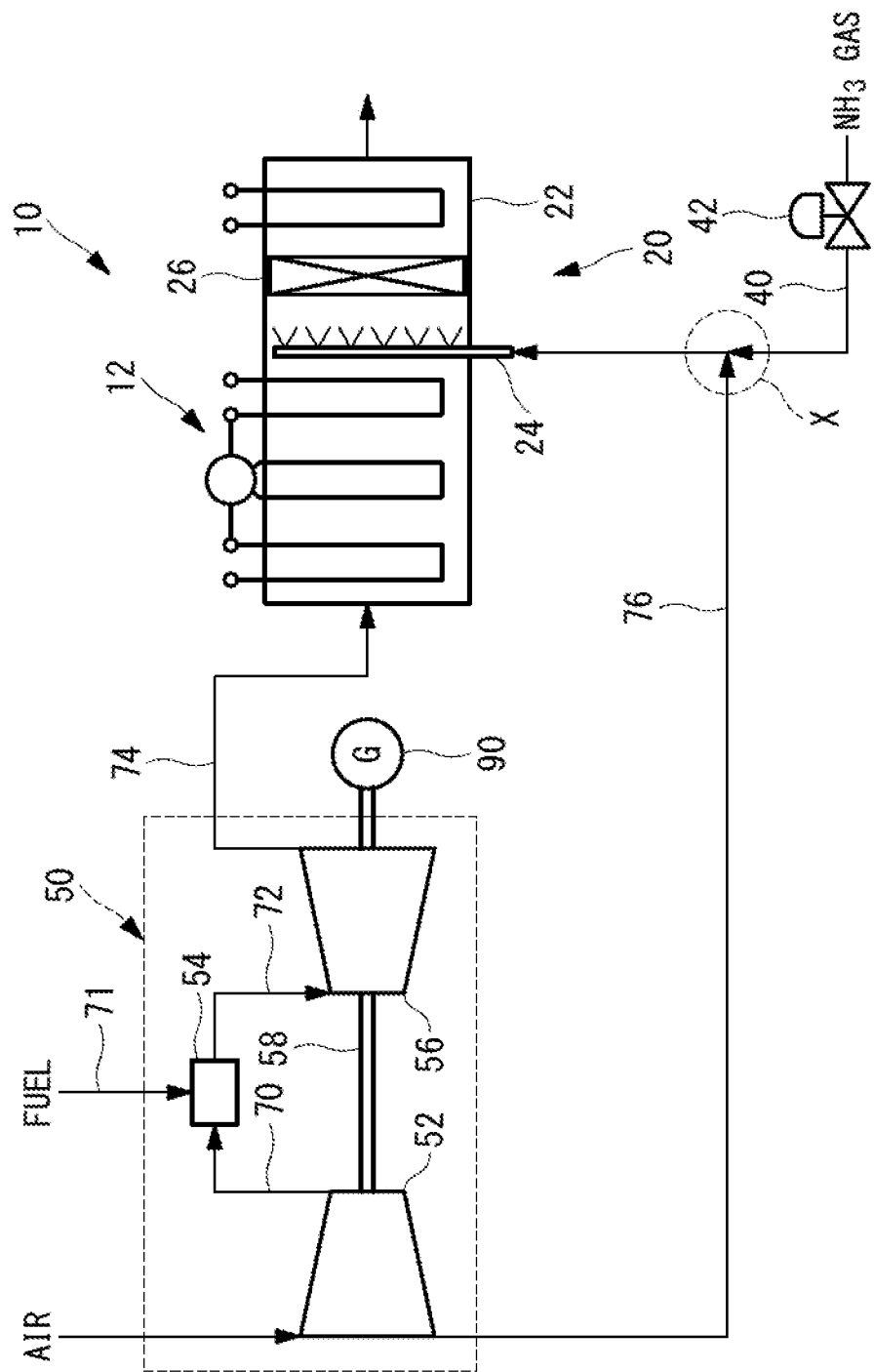
FIG. 1 is a schematic diagram showing a main portion of a gas turbine combined cycle power plant including a denitration device of an example according to some embodiments of the present disclosure.
Figure 2:
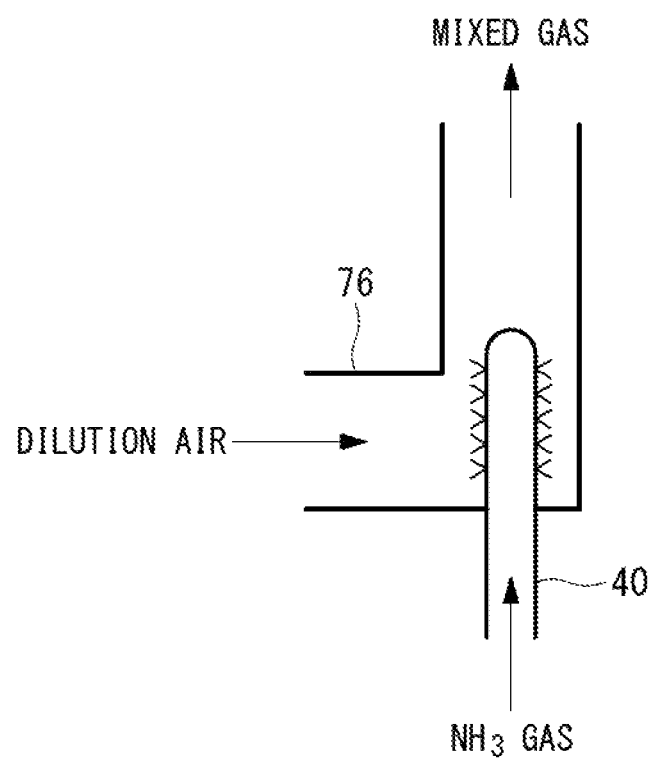
FIG. 2 is an enlarged view of a portion X in FIG. 1.

FIG. 1 shows a main portion of a gas turbine combined cycle power plant including a denitration device 20 according to the preset embodiment.

The gas turbine combined cycle power generation plant of FIG. 1 includes a gas turbine 50, a generator 90, and a heat recovery steam generator 10 as a main portion.

The gas turbine 50 includes a compressor 52, a combustor 54, and a turbine 56, and the compressor 52, the turbine 56, and the generator 90 are connected to one another by a rotary shaft 58.

The combustor 54 is connected to a compressed air supply line 70 for supplying compressed air from an outlet of the compressor 52, and also connected to a fuel supply line 71 for supplying fuel for combustion to the combustor 54. Further, the combustor 54 is connected to a combustion gas supply line 72 for supplying combustion gas from the outlet of the combustor 54 to the turbine 56.

In the combustor 54, the compressed air supplied from the compressor 52 and the fuel supplied from the fuel supply line 71 are mixed with each other and burned to generate a high-pressure high-temperature combustion gas, and the generated combustion gas is supplied to the turbine 56. Then, the turbine 56 rotationally drives the rotary shaft 58 by expanding the supplied combustion gas, thereby rotationally driving the compressor 52 and the generator 90.

The heat recovery steam generator 10 includes a duct 22. An exhaust gas discharge line 74 to which the combustion gas (exhaust gas) discharged from the gas turbine 50 (turbine 56) is guided is connected to the duct 22. Further, the duct 22 includes a heat exchanger 12 and the denitration device 20 which are arranged in this order from the upstream side of the exhaust gas flow (the left side shown in FIG. 1), and further another heat exchanger may be provided on a downstream side of the exhaust gas flow.

The heat recovery steam generator 10 performs heat exchange between feed water supplied to the heat exchanger 12 and exhaust gas of the gas turbine 50 (turbine 56) to generate steam. Further, after exhaust gas flowing through the duct 22 is heat-exchanged in the heat exchanger 12, the exhaust gas is purified by removing harmful substances (nitrogen oxides) contained in the exhaust gas, and reduced in temperature due to heat recovery in the denitration device 20, and the temperature-reduced exhaust gas is discharged to the atmosphere from a stack (not shown) connected to the downstream side of the heat recovery steam generator 10 with respect to the exhaust gas flow.

Next, the denitration device according to this embodiment will be described.

The denitration device 20 shown in FIG. 1 is installed inside the heat recovery steam generator 10 and configured so that exhaust gas passes through a denitration catalyst 26, and includes an ammonia injection grid 24 and the denitration catalyst 26 which are arranged in this order from the upstream side of the exhaust gas flow.

The ammonia injection grid 24 is connected to an ammonia gas line 40 for supplying ammonia gas, and a dilution air line 76 for supplying air (dilution air) for diluting the ammonia gas to a concentration suitable for the denitration reaction. A valve 42 is installed in the ammonia gas line 40, which makes it possible to adjust the flow rate of ammonia gas.

The dilution air line 76 and the ammonia gas line 40 join at a joining portion X. The dilution air supplied by the dilution air line 76 and the ammonia gas supplied by the ammonia gas line 40 are mixed with each other at the joining portion X to form an ammonia mixed gas (see FIG. 2), and the ammonia mixed gas is supplied to the ammonia injection grid 24.

The ammonia mixed gas is sprayed into the duct 22 by a nozzle (not shown) from which the ammonia gas is jetted from the ammonia injection grid 24. The thus-sprayed ammonia mixed gas is mixed with the exhaust gas flowing in the duct, and passes through the denitration catalyst 26 installed on the downstream side of the ammonia injection grid 24.

With respect to the denitration catalyst 26, a selective catalytic reduction (SCR; Selective Catalytic Reduction) method is used, and for example, it is obtained by carrying an active metal such as tungsten, molybdenum, or vanadium on a carrier formed of titanium oxide ($TiO_2$). When the exhaust gas mixed with the ammonia mixed gas passes through the denitration catalyst 26, nitrogen oxides (NOx) in the exhaust gas are decomposed into nitrogen and water vapor that have no environmental loading by a chemical reaction.

In the present embodiment, the dilution air line 76 for supplying the dilution air is configured as an air bleeding line 76 connected to a low compression portion of the compressor 52 of the gas turbine 50. In other words, the dilution air to be supplied to the ammonia injection grid 24 through the air bleeding line 76 is compressed air bled of the low compression section (for example, first to third stages from a suction side) of the compressor 52. During operation of the compressor 52 (for example, constant rotation of about 3600 rpm), the bled compressed air is, for example, a low compressed air which is not less than 9 kPa and not more than 15 kPa in gauge pressure of and not more than 50° C. in temperature.

According to the present embodiment, the following effects are achieved.

During operation of the gas turbine 50 in which the exhaust gas is flowing through the duct 22, a substantially constant amount of substantially normal-temperature and low-compression dilution air can be stably supplied from the low compression portion of the compressor 52 through the air bleeding line 76 to the joining portion X. As a result, the pressure in the ammonia injection grid 24 can be maintained at a pressure higher than the pressure in the duct 22, and the exhaust gas discharged from the gas turbine 50 (turbine 56) can be suppressed from flowing into the ammonia injection grid 24, whereby it is possible to prevent clogging of the ammonia injection grid 24 (particularly, the inside of the nozzle through which the ammonia gas is jetted) caused by generation and deposition of ammonium carbonate in the ammonia injection grid 24. Further, since a dedicated fan for supplying dilution air is not separately provided, peripheral devices such as a power source, a power line, and a control device necessary for driving the fan are not required, and the facility cost and running cost can be reduced.

Further, the dilution air is used only for diluting the ammonia gas, it is required only to bleed substantially normal-temperature air of the low compression portion of the compressor 52, and it is not required to bleed air of high temperature of a high compression portion of the compressor 52. In other words, air which has been compressed to a high pressure by the compressor 52 is not required to be decompressed in order to use the compressed air as dilution air, so that it is possible to reduce the loss of energy used for the compression of the air by the compressor 52.

Also, since the structure is simple, the denitration device 20 of the present embodiment can be easily installed in existing equipment, so that a reconstructing work can be facilitated.

Next, a denitration device of another embodiment according to some embodiments of the present disclosure will be described.

The denitration device 20 of the present embodiment is different from that of the above-described embodiment in that it includes a damper 78, and is similar to that of the above-described embodiment in the other points. Therefore, only points different from the above-described embodiment will be described, whereas the other elements are represented by the same reference signs and description thereof is omitted.

Figure 3:
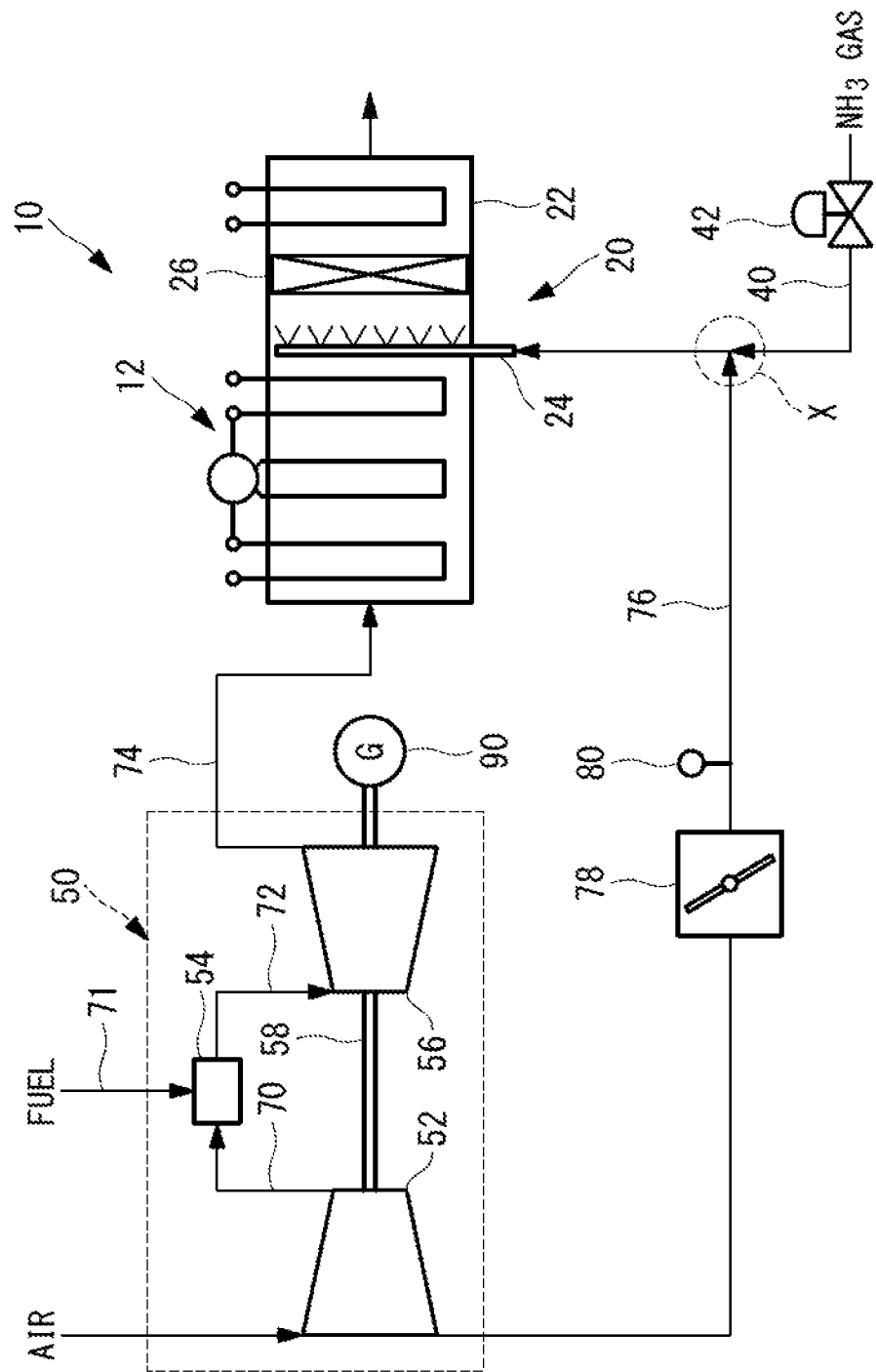
FIG. 3 is a schematic diagram showing a main portion of a gas turbine combined cycle power plant including a denitration device of another example according to some embodiments of the present disclosure.

The air bleeding line 76 connected to the ammonia injection grid 24 equipped in the denitration device 20 shown in FIG. 3 is provided with the damper 78, and a flow rate monitoring flowmeter 80 on the downstream side of the dilution air flow of the damper 78.

The opening degree of the damper 78 is set to be constant regardless of an operating load of the gas turbine 50 during operation of the gas turbine 50. For example, the opening degree of the damper 78 is set to cause the dilution air to flow at a flow rate at which the ammonia concentration of the ammonia mixed gas during operation of the gas turbine 50 falls within a predetermined range. Since the opening degree of the damper 78 is constant, the flow rate of the dilution air would be substantially constant if the rotational speed of the compressor 52 is constant at the time when the operating load of the gas turbine 50 changes. Correspondingly, when the operating load of the gas turbine 50 changes, the flow rate of the ammonia gas is adjusted by the valve 42 according to the operating load, whereby the ratio of the flow rates of the exhaust gas and the ammonia gas is kept constant or within a predetermined range.

Note that the predetermined range of the ammonia concentration of the ammonia mixed gas may be selected according to a set range of the flow rate of the ammonia gas. In other words, since the exhaust gas flow rate and the ammonia supply amount become maximum during operation under a maximum operating load of the gas turbine 50, an upper limit value of the predetermined range may be set to, for example, a value smaller than a lower limit value of an explosion range of ammonia so that safety management can be performed. Further, since the exhaust gas flow rate and the ammonia supply amount become minimum during operation under a minimum operating load of the gas turbine 50, a lower limit value of the predetermined range may be set to, for example, a value which is equal to or higher than a lower limit value of the ammonia concentration at which the denitration reaction is appropriately performed. As a result, the ammonia concentration of the ammonia mixed gas may be kept in an appropriate range by setting the lower limit value and the upper limit value of the ammonia concentration of the ammonia mixed gas for the change of the operating load of the gas turbine 50 and adjusting the ammonia concentration between the lower limit value and the upper limit value according to the operating load of the gas turbine 50 by the valve 42 so as to complement the flow rate of the ammonia gas. During operation of the gas turbine 50, the flow rate of the dilution air is substantially constant under a certain operating load of the gas turbine 50. Therefore, by setting the damper 78 to a constant opening degree (fixed opening degree) so that the dilution air flows at the flow rate at which the ammonia concentration of the ammonia mixed gas falls within a predetermined range, the ammonia mixed gas is supplied at a concentration at which the amount of ammonia necessary to the denitration reaction can be safely managed. Therefore, it is unnecessary to adjust the flow rate of the dilution air by the damper 78 during operation of the gas turbine 50.

According to the present embodiment, the following effects are achieved.

By setting the opening degree of the damper 78 to a constant opening degree (fixed opening degree), it is unnecessary to control the opening degree of the damper 78 during operation of the gas turbine 50, so that it is unnecessary to perform the control of adjusting the flow rate of the dilution air by adjusting the opening degree of the damper 78 according to the flow rate of the exhaust gas. In other words, by setting the opening degree of the damper 78 to a constant opening degree, it is possible to constantly supply an appropriate amount of dilution air during operation of the gas turbine 50 without controlling the opening degree of the damper 78. In other words, the ammonia mixed gas in which the ammonia gas and the diluting air are mixed with each other can be appropriately sprayed into the duct 22 without controlling the opening degree of the damper 78.

REFERENCE SIGNS LIST 10 heat recovery steam generator
12 heat exchanger
20 denitration device
22 duct
24 ammonia injection grid
26 denitration catalyst
40 ammonia gas line
42 valve
50 gas turbine
52 compressor
54 combustor
56 turbine
58 rotary shaft
70 compressed air supply line
71 fuel supply line
72 combustion gas supply line
74 exhaust gas discharge line
76 air bleeding line (dilution air line)
78 damper
80 flowmeter
90 generator

The invention claimed is:

1. A denitration device comprising:
 a duct that leads and distributes exhaust gas from a turbine of a gas turbine having a compressor and the turbine;
 an ammonia injection grid that sprays, into the duct, an ammonia mixed gas in which ammonia gas and dilution air are mixed with each other;
 a denitration catalyst that is installed on a downstream side of flow of the exhaust gas of the ammonia injection grid in the duct, and performs a denitration reaction between the exhaust gas and the ammonia mixed gas; and an air bleeding line that is connected to a low compression portion of the compressor and supplies a low compression air bled of the compressor into the ammonia injection grid as the dilution air, wherein the air bleeding line includes a damper configured to adjust a flow rate of the low compression air bled of the compressor, the damper has a constant opening degree fixed during operation of the gas turbine regardless of an operating load of the gas turbine, and a concentration of the ammonia mixed gas is adjusted by a flow rate of the ammonia gas.

2. A heat recovery steam generator comprising:

the denitration device according to claim 1; and a heat exchanger provided in the duct.

3. A gas turbine combined cycle power plant comprising:

the denitration device according to claim 1;

the gas turbine; and a generator that is rotationally connected to the gas turbine.

4. A denitration method for a denitration device comprising:

a duct that leads and distributes exhaust gas from a turbine of a gas turbine having a compressor and the turbine;

an ammonia injection grid that sprays, into the duct, an ammonia mixed gas in which ammonia gas and dilution air are mixed with each other;

a denitration catalyst that is installed on a downstream side of flow of the exhaust gas of the ammonia injection grid in the duct, and performs a denitration reaction between the exhaust gas and the ammonia mixed gas; and an air bleeding line that is connected to a low compression portion of the compressor and supplies a low compression air bled of the compressor into the ammonia injection grid as the dilution air, wherein the air bleeding line includes a damper configured to adjust a flow rate of the low compression air bled of the compressor, the damper has a constant opening degree fixed during operation of the gas turbine regardless of an operating load of the gas turbine, and the denitration method comprising adjusting a concentration of the ammonia mixed gas by a flow rate of the ammonia gas.

* * * * *